Figure 1:
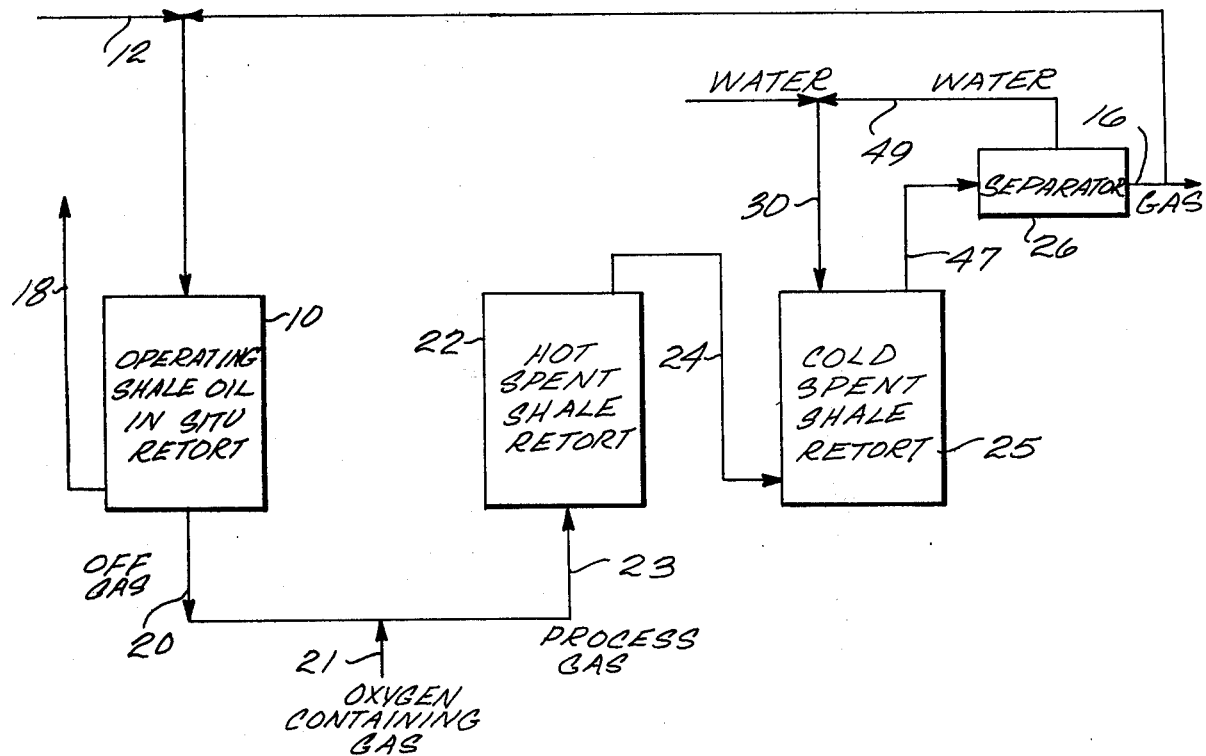

United States Patent [19]

Ridley et al.

[11] 4,140,181

[45] Feb. 20, 1979

[54] TWO-STAGE REMOVAL OF SULFUR DIOXIDE FROM PROCESS GAS USING TREATED OIL SHALE

[75] Inventors: Richard D. Ridley, Grand Junction, Colo.; Chang Y. Cha, La Verne, Calif.

[73] Assignee: Occidental Oil Shale, Inc., Grand Junction, Colo.

[21] Appl. No.: 859,185

[22] Filed: Dec. 9, 1977

Related U.S. Application Data

[63] Continuation of Ser. No. 760,038, Jan. 17, 1977, abandoned, which is a continuation-in-part of Ser. No. 593,622, Jul. 7, 1975, abandoned, which is a continuation of Ser. No. 492,822, Jul. 29, 1974, abandoned.

[51] Int. Cl.² .............................................. E21B 43/24
[52] U.S. Cl. ................................... 166/259; 166/267; 208/11 R; 299/2; 423/244
[58] Field of Search ............... 166/259, 265, 266, 267, 166/272, 302; 208/11 R; 48/197 R; 299/2; 423/242, 244

[56] References Cited

U.S. PATENT DOCUMENTS

| | | | |
|---|---|---|---|
| 3,454,958 | 7/1969 | Parker | 166/272 X |
| 3,460,620 | 8/1969 | Parker | 166/272 X |
| 3,460,867 | 8/1969 | Cameron et al. | 166/272 X |
| 3,499,489 | 3/1970 | Parker | 166/272 X |
| 3,548,938 | 12/1970 | Parker | 166/272 X |
| 3,578,080 | 5/1971 | Closmann | 166/259 |
| 3,586,377 | 6/1971 | Ellington | 166/272 X |
| 3,661,423 | 5/1972 | Garret | 299/2 |
| 3,969,089 | 7/1976 | Moss et al. | 48/197 R |
| 3,976,747 | 8/1976 | Shale et al. | 423/244 |
| 4,014,575 | 3/1977 | French et al. | 166/267 X |
| 4,069,132 | 1/1978 | Deering | 208/11 R |

OTHER PUBLICATIONS

Riesenfeld et al., *Gas Purification*, (Gulf 2nd ed.), 1974, pp. 298-302.

*Primary Examiner*—Stephen J. Novosad
*Assistant Examiner*—George A. Suchfield
*Attorney, Agent, or Firm*—Christie, Parker & Hale

[57] ABSTRACT

Sulfur dioxide is removed from a process gas by passing the process gas through a first fragmented permeable mass of particles containing treated oil shale and including alkaline earth metal oxides at a sufficient temperature to remove sulfur dioxide from the process gas. Gas containing sulfur dioxide from the first fragmented mass is passed through a second fragmented permeable mass of particles containing treated oil shale and including alkaline earth metal oxides. Water in the second fragmented mass combines with alkaline earth metal oxides in the second fragmented mass and sulfur dioxide in the gas from the first fragmented mass with resultant removal of sulfur dioxide from gas from the first fragmented mass.

31 Claims, 2 Drawing Figures

TWO-STAGE REMOVAL OF SULFUR DIOXIDE FROM PROCESS GAS USING TREATED OIL SHALE

CROSS REFERENCES

This application is a continuation of application Ser. No. 760,038, filed Jan. 17, 1977, now abandoned, which is a continuation-in-part of application Ser. No. 593,622 filed July 7, 1975, abandoned, which is a continuation of application Ser. No. 492,822 filed July 29, 1974, now abandoned. The subject matter of these applications is incorporated herein by reference.

BACKGROUND OF THE INVENTION

The presence of large deposits of oil shale in the Rocky Mountain region of the United States has given rise to extensive efforts to develop methods of recovering shale oil from kerogen in the oil shale deposits. A number of methods have been developed for processing the oil shale which involve either first mining the kerogen bearing shale and processing the shale on the surface, or processing the shale in situ. The latter approach is preferable from the standpoint of environmental impact since the spent shale remains in place, reducing the chance of surface contamination and the requirement for disposal of solid wastes.

The recovery of liquid and gaseous products from a subterranean formation containing oil shale has been described in several issued patents, one of which is U.S. Pat. No. 3,661,423, issued May 9, 1972, to Donald E. Garrett, assigned to the assignee of this application, and incorporated herein by reference. This patent describes the in situ recovery of liquid and gaseous carbonaceous materials from subterranean formations containing oil shale by explosively expanding and fragmenting formations containing oil shale to form a fragmented permeable mass of formation particles containing oil shale within the subterranean formation, referred to herein as an in situ oil shale retort. Hot retorting gases are passed through the in situ oil shale retort to convert kerogen contained in the oil shale to liquid and gaseous products.

One method of supplying the hot retorting gases used for converting kerogen contained in the oil shale, as described in the U.S. Pat. No. 3,661,423, includes the establishment of a combustion zone in the retort and the movement of an oxygen supplying gaseous feed mixture into the combustion zone to advance the combustion zone through the retort. In the combustion zone, oxygen in the gaseous feed mixture is depleted by reaction with hot carbonaceous materials to produce heat and a combustion gas. By the continued introduction of the oxygen supplying gaseous feed mixture into the combustion zone, the combustion zone is advanced through the retort.

The combustion gas and the portion of the gaseous feed mixture which does not take part in the combustion process pass through the retort on the advancing side of the combustion zone to heat the oil shale in a retorting zone to a temperature sufficient to produce kerogen decomposition, called retorting, in the oil shale to gaseous and liquid products and a residue product of solid carbonaceous material.

The liquid products and gaseous products are cooled by the cooler oil shale particles in the retort on the advancing side of the retorting zone. The liquid carbonaceous products, together with water, are collected at the bottom of the retort. An off gas containing combustion gas generated in the combustion zone, product gas produced in the retorting zone, gas from carbonate decomposition, and gaseous feed mixture that does not take part in the combustion process is also withdrawn at the bottom of the retort.

The off gas, which contains nitrogen, hydrogen, carbon monoxide, carbon dioxide, water vapor, methane and other hydrocarbons, and sulfur compounds such as hydrogen sulfide, can be used as a fuel or otherwise disposed of but should be purged of the sulfur compounds before discharge into the environment. The sulfur compounds in the off gas are generated from naturally occurring sulfur compounds in oil shale during the heating and combustion in the in situ oil shale retort. Unless removed, the sulfur compounds are oxidized to form sulfur dioxide when the off gas is oxidized. Sulfur dioxide is a pollutant and can combine with water to form $H_2SO_3$ and other polythionic acids which are toxic and corrosive.

While various processes for the removal of sulfur dioxide from gases such as off gas from oil shale retorting have been devised, most such known processes involve contacting the gas with an absorbing agent to convert the sulfur dioxide to a removable liquid or solid. The spent absorbing agent must then either be chemically regenerated or disposed of and replaced. Various absorption agents have been used, such as alkali metal carbonates, but the regeneration rate of these agents is low and the initial cost of many of these agents is too large to permit discharging of the spent agent. Water and limestone have been used as throwaway agents. Water systems have the disadvantage that they require cooling and heating of large quantities of gas and the resulting acidity of the water represents a disposal problem. Lime and limestone have been used as absorbents in both dry systems and wet systems. Since sulfur dioxide reacts more readily with lime, which is calcium oxide, than with limestone, which is principally calcium carbonate, calcination of the limestone is usually used. However, the reaction rate is still prohibitively low at reasonable temperatures so the gas is heated to temperatures above 1000° F. to be effective. A large excess of lime or limestone is required because the resulting calcium sulfite forms on the particle surfaces, thereby quickly reducing the reaction rate with the coated lime or limestone particles.

Thus, there is a need for an economical process for removing sulfur compounds from the off gas from an in situ oil shale retort.

SUMMARY

According to the present invention, sulfur dioxide is removed from a process gas, such as oxidized off gas from oil shale retorting, by passing the process gas through a first fragmented permeable mass of particles containing treated oil shale and including alkaline earth metal oxides at a sufficient temperature to remove sulfur dioxide from the process gas. The first fragmented permeable mass can be in an in situ oil shale retort in a subterranean formation containing oil shale. Gas containing sulfur dioxide from the first fragmented mass is passed through a second fragmented permeable mass of particles containing treated oil shale and including alkaline earth metal oxides. The second fragmented permeable mass of particles also can be in an in situ oil shale retort in a subterranean formation containing oil shale. The second mass includes water, which can be provided by introducing water to the second mass. The water combines with alkaline earth metal oxides in the second fragmented mass and sulfur dioxide in gas from the first fragmented mass. Thus, according to this invention, sulfur dioxide is removed from the process gas by sequentially passing the gas through first and second fragmented permeable masses of particles containing treated oil shale and including alkaline earth metal oxides.

Preferably, the first fragmented permeable mass and the second fragmented permeable mass each contain a stoichiometric excess of alkaline earth metal oxides and/or hydroxides relative to the sulfur dioxide in the process gas when the process gas is passed through each fragmented permeable mass of particles to permit quick removal of the sulfur dioxide from the process gas and to insure that a high proportion of the sulfur dioxide is removed from the process gas.

Preferably at least a portion of the first fragmented mass has a temperature greater than about 500° F., and more preferably greater than about 1000° F. when the process gas is passed therethrough as higher temperatures permit quicker and more complete removal of the sulfur dioxide and/or treatment of larger quantities of process gas. Since treated oil shale particles can have a residual temperature in excess of 500° F. from treating, it is preferred that the process gas be passed through the first fragmented mass before the temperature of all of the treated oil shale falls below about 500° F.

The water in the second mass can be introduced into the second mass either alone, or it can be mixed with the gas from the first fragmented mass. Preferably water is removed from effluent gas from the second fragmented mass and the removed water is recycled into the second fragmented mass.

DRAWINGS

Figure 2:
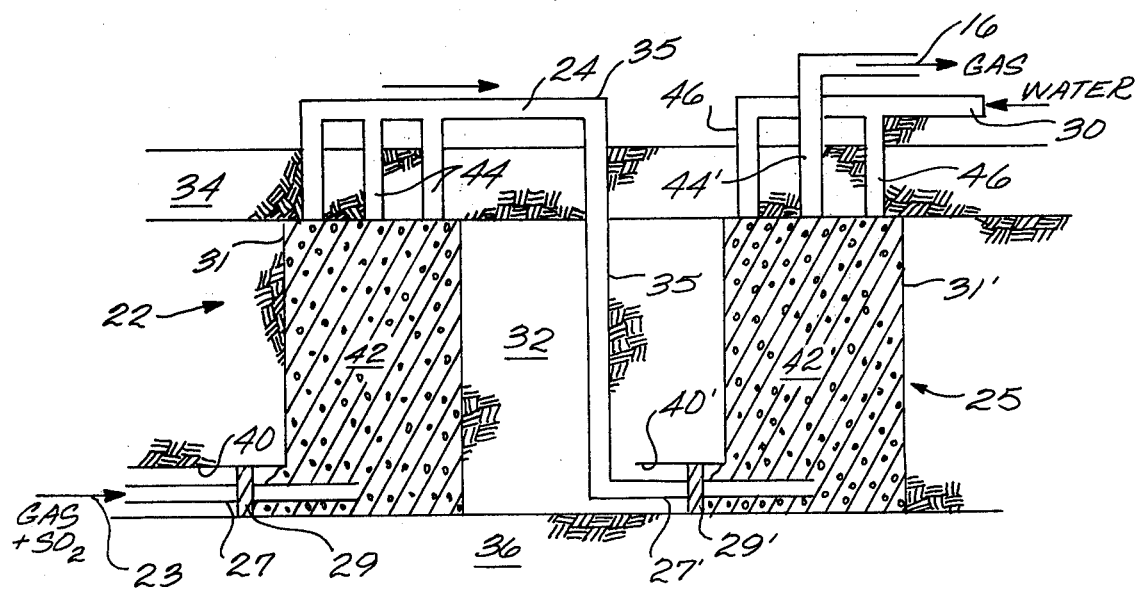

These and other features, aspects and advantages of the present invention will become more apparent with respect to the following description of the invention, appended claims, and accompanying drawings, where:

FIG. 1 is a schematic block diagram of a process embodying features of this invention for retorting oil shale and using spent retorts for removing sulfur dioxide from a process gas obtained from retort off gas; and FIG. 2 schematically represents the use of two spent in situ oil shale retorts for removing sulfur dioxide from process gas.

DESCRIPTION

The present invention will now be described in general terms with reference to FIG. 1. In FIG. 1, an in situ oil shale retort 10 is illustrated as being in the operational mode with shale oil 18 and an off gas stream 20 including product gas being removed from the bottom of the retort 10. An active retort or retort in the operational mode is a retort in which combustion and/or retorting of oil shale are being effected. Combustion and retorting are effected by introducing an oxygen supplying gaseous feed such as air 12 into the retort. The off gas can contain large amounts of nitrogen with lesser amounts of hydrogen, carbon monoxide, carbon dioxide, methane, higher hydrocarbons, water vapor and sulfur compounds such as hydrogen sulfide. Oxidizable constituents in the off gas can be partially or totally oxidized to assure that sulfur compounds in the off gas are oxidized to sulfur dioxide. This can be effected by the addition of an oxygen containing gas 21 such as air to the off gas and reaction to yield a process gas 23 containing sulfur dioxide. The process gas 23 is shown in FIG. 1 as being introduced to the bottom of a first spent retort, a hot spent oil shale retort 22 containing treated oil shale. Suitable pumps or blowers (not shown) can be used to induce the desired flow rate of the process gas. The process gas 23 containing sulfur dioxide passes upwardly through the hot spent retort 22. A portion of the sulfur dioxide in the process gas is removed therefrom as the process gas passes upwardly through the hot spent in situ oil shale retort 22. Effluent gas 24 from the hot spent in situ retort 22 is conveyed to the bottom of a second in situ oil shale retort, a cold spent retort 25, containing treated oil shale, passes upwardly through the second retort and is withdrawn at the top. As indicated in FIG. 1, water is introduced through a line 30 to the top of the second retort 25. The injection of water can be done simultaneously with or before passing gas from the hot spent retort 22 through the cold spent retort 25. The introduced water combines with alkaline earth metal oxides in the cold spent retort 25 and sulfur dioxide contained in effluent gas from the first spent retort introduced to the second spent retorts. Gas 47 withdrawn for the cold spent retort 25 can be passed through a separator 26 where water is removed from the gas. Removed water 49 can be reintroduced or recycled into the cold spent retort 25 for removal of sulfur dioxide in incoming gas. Effluent gas 16 from the separator can be introduced to the active retort 10 as a portion of the oxygen supplying gaseous feed.

The present invention will now be discussed in more detail with reference to FIG. 2. As shown in FIG. 2, the spent in situ oil shale retorts 22 and 25 are each in the form of a cavity 31 and 31', respectively, formed in an unfragmented subterranean formation 32 containing oil shale covered by an overburden 34 and underlayed by a rock base 36.

Only the hot spent retort 22 will now be described. Elements common to the first 22 and second retorts 25 will be designated with the same number, unprimed for the hot spent retort and primed for the cold spent retort.

The cavity of the hot spent retort 22 contains an expanded or fragmented permeable mass 42 of formation particles containing treated oil shale and including alkaline earth metal oxides. A spent retort is a retort in which retorting and combustion of oil shale contained therein have been effected and completed. The cavity can be created simultaneously with fragmentation of the mass of formation particles by blasting by any of a variety of techniques. A method of forming an in situ oil shale retort is described in U.S. Pat. No. 3,661,423. A variety of other techniques also can be used.

One or more conduits or ducts 44 communicate with the top of the fragmented mass of formation particles. During the retorting operation of the retort 22, a combustion zone is established in the retort 22 and advanced by introducing as a combustion zone feed a gaseous feed containing an oxygen supplying gas, such as air or air mixed with other gases, into the in situ oil shale retort through the conduits 44. As the gaseous feed is introduced to the retort 22, oxygen oxidizes carbonaceous material in the oil shale to produce combusted oil shale and combustion gas. Heat from the exothermic oxidation reactions carried by flowing gases advances the combustion zone downwardly through the fragmented mass of particles.

Combustion gas produced in the combustion zone and any unreacted portion of the oxygen supplying gaseous feed pass through the fragmented mass of particles on the advancing side of the combustion zone to establish a retorting zone on the advancing side of the combustion zone. Kerogen in the oil shale is retorted in the retorting zone to liquid and gaseous products.

There is an access drift, adit, tunnel 40 or the like in communication with the bottom of the retort. The drift can contain a sump (not shown) in which liquid products are collected to be withdrawn for further processing. An off gas containing gaseous products, combustion gas, gas from carbonate decomposition, and any unreacted portion of the oxygen supplying gaseous feed is also withdrawn from the in situ oil shale retort 22 by way of the drift 40 via a conduit such as a pipe 27 extending through a bulkhead 29. The off gas can contain large amounts of nitrogen with lesser amounts of hydrogen, carbon monoxide, carbon dioxide, methane and higher hydrocarbons, water vapor, and sulfur compounds such as hydrogen sulfide. It is desirable to remove at least a portion of the sulfur compounds from the off gas so the off gas can be used as fuel gas for power generation in a work engine such as a gas turbine, or if the off gas is flared, to limit the sulfurous emission.

At the end of retorting operations at least part of the oil shale in the first retort 22 and the second retort 25 is at an elevated temperature which can be in excess of 1000° F. The hottest region of a retort is often near the bottom, and a somewhat cooler region is at the top due to continual cooling by gaseous feed during retorting and conduction of heat to adjacent shale. The oil shale in the retorts gradually cools toward ambient temperature when retorting and combustion are complete. In the illustrated embodiment, the second spent retort 25 is somewhat cooler than the first spent retort 22 due to lapse of time after active retorting, cooling by use analagous to that of the hot spent retort 22, and/or introduction of water.

The spent retorts 22, 25 illustrated in FIG. 2 have had retorting and combustion operations completed and each contains a fragmented permeable mass of formation particles containing combusted oil shale. The two retorts 22, 25 can be retorted simultaneously or at different times. As used herein, the term "retorted oil shale" refers to oil shale heated to sufficient temperature to decompose kerogen in an environment substantially free of free oxygen so as to leave a solid carbonaceous residue. The term "combusted oil shale" refers to oil shale of reduced carbon content due to oxidation by a gas containing free oxygen. The term "treated oil shale" refers to oil shale treated to remove organic materials and includes retorted and/or combusted oil shale. An individual particle containing oil shale can have a core of retorted oil shale and an outer "shell" of combusted oil shale. Such can occur when oxygen has diffused only part way through the particle during the time it is at an elevated temperature and in contact with an oxygen supplying gas.

Oil shale contains large quantities of alkaline earth metal carbonates, principally calcium and magnesium carbonates which during retorting and combustion are at least partly calcined to produce alkaline earth metal oxides. Thus, combusted oil shale particles in the retorts 22, 25 can contain approximately 20 to 30% calcium oxide and 5 to 10% magnesium oxide, with smaller quantities of less reactive oxides present.

When it is desired to remove the sulfur compounds from off gas from an active in situ retort, the off gas can be partially or totally oxidized to assure that sulfur compounds are oxidized to sulfur dioxide.

Referring to FIG. 2, a process gas stream 23 containing sulfur dioxide, such as oxidized off gas from the active oil shale retort 10, is introduced through the pipe 27 to the first spent retort 22. There is sufficient differential pressure between the top and bottom of the first spent retort 22 to cause the process gas to flow through the pipe 27, which is in communication with the bottom of the hot spent retort 22, and upwardly through the ducts 44, which are in communication with the upper boundary of the fragmented mass of particles containing treated oil shale in the retort 22. For economy, the ducts 44 used for introducing oxygen supplying gaseous feed to the retort 22 during the retorting operation are utilized to withdraw a purified effluent gas 24 from the retort. Similarly, the pipe 27 used for withdrawing off gas from the retort during the retorting operation is utilized for introducing the process gas stream 23 to the retort. Alternatively, the sulfur dioxide containing gas can be introduced to the retort 22 through the ducts 44 and the purified effluent gas 24 can be withdrawn from the retort 22 via the pipe 27. The effluent gas 24 has a relatively lower sulfur dioxide and total sulfur concentration than the process gas 23 introduced into the retort 22.

As the process gas containing sulfur dioxide passes through the hot spent retort 22, sulfur dioxide present in the gas combines with the oxides of calcium and magnesium to form calcium and magnesium sulfites. Exemplary of the reactions which occur is the following reaction:

$$MO + SO_2 \rightarrow MSO_3 \tag{1}$$

where M represents an alkaline earth metal. Any water present in the hot spent retort is expected to enhance the rate of reaction of sulfur dioxide with alkaline earth metal oxides. Thus a substantial portion of the sulfur dioxide can be removed from the gas passing through the retort, especially at high temperatures of the mass of particles in the retort and at high molar ratios of alkaline earth metal oxides to sulfur dioxide. Therefore, when an oil shale retort containing treated oil shale is used, the sulfur dioxide and the total concentration of sulfur compounds in the process gas stream can be reduced.

While the direct reaction between sulfur dioxide and calcium or magnesium oxide to form the sulfite occurs slowly at ambient temperature, at temperatures above about 1000° F. short reaction times occur. The heat for increasing input gas temperature is at least partly obtained from the sensible heat remaining in the spent shale retort. At temperatures from about 500° F. to about 1000° F. the reaction proceeds to completion, but slower. Thus, the reaction continues at lower rates until the temperature of the fragmented mass of retorted shale drops too low to provide adequate removal of the sulfur dioxide. At temperatures below about 450° F. to 500° F., the flow rate of the gas can be too great and residence time in the retort too low for effective removal of sulfur dioxide in the retort 22. Therefore, preferably at least a portion of the fragmented mass in the second retort has a temperature in excess of about 500° F., and more preferably greater than about 1000° F., from treating when the process gas is passed therethrough.

The maximum temperature for removing sulfur dioxide from the process gas 23, by this method, is the fusion temperature of oil shale, which is about 2100° F.

Sulfur dioxide is removed from effluent gas 24 from the hot spent shale retort 22 by passing the effluent gas through the cold spent shale retort 25. The fragmented permeable mass 42' of formation particles containing treated oil shale in the second retort 25 includes water, and the water combines with alkaline earth metal oxides in the cold spent retort 25 and sulfur dioxide in the effluent gas 24 with resultant removal of the sulfur dioxide from the effluent gas.

It is believed that removal of sulfur dioxide from the effluent gas occurs according to the following reactions as described in the book, *Gas Purification,* by Riesenfeld and Kohl, (Gulf Pub. Co., 2nd Ed., 1974) Pages 298–302:

$$MO + H_2O \rightarrow M(OH)_2 \quad (2)$$

$$SO_2 + H_2O \rightarrow H_2SO_3 \quad (3)$$

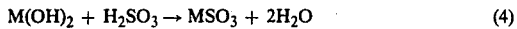

$$M(OH)_2 + H_2SO_3 \rightarrow MSO_3 + 2H_2O \quad (4)$$

where M represents an alkaline earth metal.

The effluent gas 24 from the hot spent retort 22 passes from the ducts 44 through a transfer line 35 to a pipe 27' which extends through the drift 40' and the bulkhead 29' into the bottom of the cold spent in situ oil shale retort 25. The effluent gas flows upwardly through the retort 25 and is withdrawn through one or more output ducts 44'.

As described above with regard to the hot spent retort 22, preferably the same piping and ducting used for retorting oil shale in the cold spent retort 25 when the cold spent retort is an active retort is used for introducing effluent gas 24 and withdrawing a purified gas 16 from the cold spent retort 25.

Because of combination of sulfur dioxide in the gas introduced to the second retort 25 with water and alkaline metal earth oxides present in the second retort, the sulfur dioxide concentration and total sulfur concentration of the gas 24 is reduced. Therefore a purified gas stream 16 having a lower sulfur dioxide concentration and a lower total sulfur concentration than the sulfur dioxide concentration and total sulfur concentration of the effluent gas stream 24 and the process gas stream 23 is withdrawn from the second retort 25 via the output duct 44'.

The water required for combination with sulfur dioxide and alkaline earth metal oxides in the cold spent retort 25 can be provided by any suitable method such as by mixing steam or a mist of atomized water with the sulfur dioxide containing gas 24 prior to introducing it into the retort. Alternatively, as shown in FIGS. 1 and 2, the water can be introduced into the retort 25 separately from the sulfur dioxide containing gas via a water injection line 30. The water injection line 30 is connected to a plurality of pipes 46 extending down to the top of the fragmented permeable mass in the second in situ retort 25. The water can be injected through the pipes 46 into the top of the retort 25 in the form of a fine stream, a spray, a mist or steam. The water can be introduced into the cold spent retort 25 at the same time as or prior to introduction of the sulfur dioxide containing gas to the cold spent retort 25.

As is true with the first spent retort 22 as discussed above, the sulfur dioxide containing gas 24 from the first spent retort 22 can be passed either upwardly or downwardly through the second spent retort 25.

As the temperature of oil shale in the second retort 25 is reduced to a temperature lower than about 580° C. (1076° F.), the decomposition temperature of calcium hydroxide, water introduced into the retort can react with calcium oxide to produce alkaline earth hydroxide. Therefore, preferably the temperature of the fragmented mass in the cold spent retort is less than about 580° C., and more preferably, less than about 350° C. (662° F.), the decomposition temperature of magnesium hydroxide, so magnesium hydroxide is available for reaction (4). When the temperature of the fragmented permeable mass in the cold spent retort 25 is reduced to lower than the boiling temperature of water, water added to the top of the retort 25 can percolate downwardly through the retort as liquid water and combine with alkaline earth metal oxides in the retort.

At least a portion of the alkaline earth metal oxides in both the hot spent retort 22 and the cold spent retort 25 can be hydrated to the corresponding alkaline earth hydroxides.

Preferably there is a large stoichiometric excess of alkaline earth metal oxides and/or hydroxides in the particles containing treated oil shale in both the hot spent retort 22 and the cold spent retort 25 relative to the sulfur dioxide in the gas introduced to the retorts. However, as the treated oil shale in the retorts is used to remove sulfur dioxide, the amount of alkaline earth metal oxides and/or hydroxides available for removing sulfur dioxide decreases. In addition, calcium sulfite precipitates on the surface of the formation particles and reduces the efficiency of sulfur dioxide removal. When there is no longer a stoichiometric excess of alkaline earth metal oxides and/or hydroxides relative to the sulfur dioxide, the sulfur dioxide containing process gas can be diverted to another hot spent retort and/or another cold spent retort containing formation particles containing oil shale treated to remove organic material.

Generally, sufficient alkaline earth metal oxides and/or hydroxides are present in a retort to remove at least a substantial portion of the sulfur dioxide formed from oxidation of hydrogen sulfide in off gas generated from retorting oil shale in a retort of comparable size. For example, retorting one ton of formation particles containing oil shale can yield 750 pounds of alkaline earth metal oxides and/or hydroxides and 18,000 standard cubic feet of off gas containing up to 0.17% by weight of hydrogen sulfide. Thus, for each mole of hydrogen sulfide produced in a retort, there are available over 300 moles of alkaline earth metal oxides and/or hydroxides in the treated oil shale to remove sulfur dioxide formed from oxidation of the hydrogen sulfide. Thus when removing hydrogen sulfide from off gas generated during oil shale retorting, a large stoichiometric excess of alkaline earth metal oxides and/or hydroxides are available. Therefore, the presence of precipitated calcium sulfite on the surface of formation particles has a limited effect on removal of sulfur dioxide and at least the major part of the sulfur dioxide in oxidized off gas from an active in situ retort can be removed with treated oil shale according to principles of this invention.

Preferably the sulfur dioxide containing process gas is introduced to the hottest portion of the fragmented permeable mass in the hot spent retort 22 to minimize pressure drop through the retort and the cost of passing gas through the retort. By introducing the gas to the hottest portion of the retort 22, heat is transferred by flowing gas to the cooler portions of the retort, with the result that the fragmented permeable mass eventually has a substantially uniform temperature gradient, with the temperature decreasing in the direction of movement of the gas. This results in reduced pressure drop across the retort because the volumetric flow rate of gas through the retort 22 decreases as the temperature of the fragmented mass decreases. Also the void fraction of the fragmented permeable mass increases due to thermal contraction of the formation particles as the mass of particles cools. Thus, the cross sectional area available for flow of gas through the retort increases.

Therefore, as shown in FIG. 2, when a fragmented peremable mass in an in situ oil shale retort is retorted from top to bottom, preferably the sulfur dioxide containing gas is introduced to the bottom of the retort, and purified effluent gas is withdrawn from the top of the retort. An advantage of introducing the gas to the bottom of the retort, as shown in FIG. 2 is that off gas from the bottom of an adjacent active retort can be directly introduced to the bottom of the hot spent retort 22 without having to incur the capital and operating expenses of transferring the off gas to the top of the spent retort.

The method of this invention has many advantages over prior art processes described above. By utilizing treated oil shale the purchase of an absorbent such as lime or limestone is avoided. The cost of calcining limestone and grinding and injecting absorbent into the gas stream also is avoided. Furthermore, treated oil shale used as an absorbent remains in the ground, thereby eliminating disposal problems. In addition, a large stoichiometric excess of treated oil shale is available. The regeneration of treated oil shale used as an absorbent is unnecessary even if its activity is greatly reduced by alkapoisoning. A long residence time of the sulfur dioxide containing gas stream in the retort can be utilized. Because of the stoichiometric excess of treated oil shale, a surface coating of sulfites on the retorted oil shale particles has minimal effect on removal of sulfur dioxide. Another advantage of the method of the invention is that by utilizing the sensible heat of retorted oil shale in the hot spent retort, which otherwise might not be used, heating of the gas prior to removing sulfur dioxide is avoided.

Although the invention has been described in considerable detail with reference to certain versions thereof, other versions of the invention are possible. Therefore, the spirit and scope of the appended claims should not necessarily be limited to the description of the versions contained herein.

What is claimed is:

1. A method for recovering gaseous products from a first in situ oil shale retort in a subterranean formation containing oil shale, said first in situ retort containing a fragmented permeable mass of particles containing oil shale and having a combustion zone and a retorting zone advancing therethrough, the method comprising the steps of:
   (a) introducing into the first in situ oil shale retort on the trailing side of the combustion zone a combustion zone feed comprising oxygen to advance the combustion zone through the fragmented mass of particles and produce combustion gas in the combustion zone;
   (b) passing said combustion gas and any unreacted portion of the combustion zone feed through a retorting zone in the fragmented mass of particles on the advancing side of the combustion zone, wherein oil shale is retorted and gaseous products are produced;
   (c) withdrawing a retort off gas comprising said gaseous products, combustion gas and any gaseous unreacted portions of the combustion zone feed and including hydrogen sulfide from the first in situ oil shale retort from the advancing side of the retorting zone;
   (d) oxidizing hydrogen sulfide in the retort off gas to sulfur dioxide;
   (e) reducing the sulfur dioxide and total sulfur concentration of oxidized retort off gas from the first retort by the steps of:
      (i) during a first period of time introducing a gaseous combustion zone feed containing oxygen into a combustion zone in a second in situ oil shale retort in a subterranean formation containing oil shale and including alkaline earth metal carbonates, said second in situ retort containing a fragmented permeable mass of formation particles containing oil shale and alkaline earth metal carbonates, wherein the gaseous combustion zone feed advances the combustion zone through the fragmented mass of particles and converts at least a portion of the alkaline earth metal carbonates to alkaline earth metal oxides and produces combusted oil shale; and
      introducing a gaseous combustion zone feed containing oxygen into a combustion zone in a third in situ oil shale retort in a subterranean formation containing oil shale and including alkaline earth metal carbonates, said third in situ retort containing a fragmented permeable mass of formation particles containing oil shale and including alkaline earth metal carbonates, wherein the gaseous combustion zone feed advances the combustion zone through the fragmented mass of particles and converts at least a portion of the alkaline earth metal carbonates to alkaline earth metal oxides and produces combusted oil shale; and thereafter
      (ii) during a second period of time introducing at least a portion of the oxidized retort off gas from the first retort into the second retort, wherein at least a portion of the sulfur dioxide in oxidized retort off gas combines with alkaline earth metal oxides contained in the second retort,
      withdrawing gas containing sulfur dioxide from the second retort, and
      introducing water into the third retort; and
      (iii) introducing sulfur dioxide containing gas withdrawn from the second retort of the third retort for combining water introduced to the third retort with alkaline earth metal oxides in the third retort and sulfur dioxide in gas withdrawn from the second retort for removal of sulfur dioxide from gas withdrawn from the second retort to yield gas with relatively lower sulfur dioxide and total sulfur concentration than the sulfur dioxide and total sulfur concentration of the oxidized retort off gas, and withdrawing such gas with relatively lower sulfur dioxide and total sulfur concentration from the third retort.

2. The method of claim 1 wherein the oxidized retort off gas from the first retort is introduced into the second retort while at least a portion of the oil shale in the second retort remains at a temperature greater than about 500° F. from advancement of the combustion zone therethrough.

3. A method for removing sulfur dioxide from a process gas comprising the steps of:
   passing a process gas containing sulfur dioxide through a first fragmented permeable mass of particles containing treated oil shale and including alkaline earth metal oxides at a sufficient temperature to remove sulfur dioxide from the process gas; and
   passing gas containing sulfur dioxide from the first fragmented mass through a second fragmented permeable mass of particles containing treated oil shale and including alkaline earth metal oxides, said second mass including water for combining with alkaline earth metal oxides in the second fragmented mass and sulfur dioxide in the gas from the first fragmented mass for removal of sulfur dioxide from gas from the first fragmented mass.

4. The method of claim 3 wherein the first fragmented mass has a stoichiometric excess of alkaline earth metal oxides and/or hydroxides relative to the sulfur dioxide in the process gas when the process gas is passed therethrough.

5. The method of claim 3 wherein the first fragmented mass has a temperature greater than about 1000° F. when the process gas is passed therethrough.

6. The method of claim 3 wherein the second fragmented mass has a temperature less than about 580° C. when the gas from the first fragmented mass is passed therethrough.

7. The method of claim 3 wherein at least a portion of the first fragmented mass has a residual temperature in excess of about 500° F. from treating when the process gas is passed therethrough.

8. The method of claim 3 wherein the second fragmented mass has a temperature less than about 350° C. when gas from the first fragmented mass is passed therethrough.

9. The method of claim 8 wherein at least a portion of the first fragmented mass of treated oil shale particles has a temperature of greater than about 500° F. when the process gas is passed therethrough.

10. The method of claim 3 wherein the first fragmented permeable mass of particles contains combusted oil shale and the second fragmented permeable mass of particles contains combusted oil shale.

11. A method for removing sulfur dioxide from gas from oil shale retorting comprising the steps of:
   oxidizing hydrogen sulfide in gas from oil shale retorting to sulfur dioxide;
   introducing gas from oil shale retorting containing sulfur dioxide into a first fragmented permeable mass of particles containing treated oil shale and including alkaline earth metal oxides to remove sulfur dioxide from the gas, wherein at least a portion of the first fragmented mass is at a temperature greater than about 500° F. when the gas from oil shale retorting is introduced thereto;
   withdrawing gas containing sulfur dioxide from the first fragmented mass;
   introducing water into a second fragmented permeable mass of particles containing treated oil shale and including alkaline earth metal oxides;
   introducing gas containing sulfur dioxide withdrawn from the first fragmented mass into the second fragmented mass for combining sulfur dioxide in gas withdrawn from the first fragmented mass with alkaline earth metal oxides and water in the second fragmented mass for removal of sulfur dioxide from gas withdrawn from the first fragmented mass; and
   withdrawing gas from the second fragmented mass.

12. The method of claim 11 wherein at least a portion of the first fragmented mass has a temperature greater than about 500° F. when the gas from oil shale retorting is introduced thereto.

13. The method of claim 11 wherein the gas withdrawn from the second fragmented mass contains water comprising the additional steps of:
   removing water from gas withdrawn from the second fragmented mass; and
   introducing the removed water to the second fragmented mass.

14. A method for removing sulfur dioxide from a process gas resulting from oil shale retorting comprising the steps of:
   introducing a process gas resulting from oil shale retorting containing sulfur dioxide to a first in situ oil shale retort in a subterranean formation containing oil shale, the first in situ retort containing an explosively expanded and fragmented permeable mass of particles containing treated oil shale and including alkaline earth metal oxides at a sufficient temperature to remove sulfur dioxide from the process gas;
   withdrawing gas containing sulfur dioxide from the first in situ oil shale retort;
   introducing water to a second in situ oil shale retort in a subterranean formation containing oil shale, the second in situ retort containing an explosively expanded and fragmented permeable mass of particles containing treated oil shale and including alkaline earth metal oxides;
   introducing gas containing sulfur dioxide withdrawn from the first in situ oil shale retort to the second in situ oil shale retort for combining sulfur dioxide in the gas withdrawn from the first in situ oil shale retort with alkaline earth metal oxides and water in the second in situ oil shale retort for removal of sulfur dioxide from gas withdrawn from the first in situ oil shale retort to yield a gas of relatively lower sulfur dioxide concentration than the sulfur dioxide concentration of the process gas; and
   withdrawing such gas of relatively lower sulfur dioxide concentration from the second in situ oil shale retort.

15. The method of claim 14 in which the first in situ oil shale retort contains a stoichiometric excess of alkaline earth metal oxides and/or hydroxides relative to the sulfur dioxide in the process gas when the process gas is introduced to the first in situ oil shale retort.

16. The method of claim 14 wherein the second in situ oil shale retort contains a stoichiometric excess of alkaline earth metal oxides and/or hydroxides relative to the sulfur dioxide in gas withdrawn from the first in situ retort when the gas withdrawn from the first in situ retort is introduced to the second in situ retort.

17. The method of claim 14 in which process gas is introduced to the bottom of the first in situ retort.

18. The method of claim 17 in which gas withdrawn from the first in situ retort is introduced to the bottom of the second in situ retort.

19. The method of claim 14 in which gas withdrawn from the first in situ retort is introduced to the bottom of the second in situ retort.

20. The method of claim 14 in which water is introduced to the top of the second in situ oil shale retort.

21. The method of claim 14 in which the step of introducing water to the second retort comprises mixing water with gas withdrawn from the first in situ retort.

22. The method of claim 21 in which the water comprises steam.

23. The method of claim 21 in which the water comprises a mist.

24. A method for removing sulfur dioxide from a process gas comprising the steps of:

passing a process gas containing sulfur dioxide through a first fragmented permeable mass of particles containing treated oil shale and including alkaline earth metal oxides at a sufficient temperature to remove sulfur dioxide from the process gas;

withdrawing gas containing sulfur dioxide from the first fragmented mass;

mixing water with gas withdrawn from the first fragmented mass; and introducing the mixed water and gas withdrawn from the first fragmented mass to a second fragmented permeable mass of particles containing treated oil shale and including alkaline earth metal oxides for combining sulfur dioxide in gas withdrawn from the first fragmented mass and water with alkaline earth metal oxides in the second fragmented mass for removal of sulfur dioxide from gas withdrawn from the first fragmented mass.

25. The method of claim 24 in which the step of mixing comprises mixing gas withdrawn from the first fragmented mass with steam.

26. The method of claim 24 in which the step of mixing comprises mixing gas withdrawn from the first fragmented mass with a spray of water.

27. The method of claim 24 wherein the first fragmented mass has a stoichiometric excess of alkaline earth metal oxides and/or hydroxides relative to the sulfur dioxide in the process gas when the process gas is passed therethrough.

28. The method of claim 24 wherein at least a portion of the first fragmented mass has a temperature greater than about 1000° F. when the process gas is passed therethrough.

29. The method of claim 24 wherein the second fragmented mass has a temperature less than about 580° C. when gas withdrawn from the first fragmented mass is introduced thereto.

30. The method of claim 24 wherein at least a portion of the first fragmented mass has a residual temperature in excess of about 500° F. from treating when the process gas is passed therethrough.

31. The method of claim 24 wherein the first fragmented permeable mass of particles contains combusted oil shale and the second fragmented permeable mass of particles contains combusted oil shale.

* * * * *